United States Patent [19]

Hampshire

[11] 4,069,000
[45] Jan. 17, 1978

[54] MOLD FOR SHAPING AND CURING REINFORCED PLASTIC MATERIAL

[75] Inventor: William J. Hampshire, Peninsula, Ohio

[73] Assignee: The Goodyear Tire & Rubber Company, Akron, Ohio

[21] Appl. No.: 675,993

[22] Filed: Apr. 12, 1976

[51] Int. Cl.² .............................................. B29C 17/02
[52] U.S. Cl. .................................... 425/395; 425/412; 425/445; 425/812; 264/322
[58] Field of Search ................. 425/395, 383, 384, 412, 425/423, 416, 812, 445; 264/322

[56] References Cited

U.S. PATENT DOCUMENTS 3,988,089  10/1976  Hampshire ........................... 425/82

*Primary Examiner*—Robert L. Spicer, Jr.
*Attorney, Agent, or Firm*—F. W. Brunner; J. R. Dwelle; Frederick K. Lacher

[57] ABSTRACT

A preform of oriented plastic coated fibers is shaped by closing of a mold on the preform. The mold contains a molding space having substantially the final shape of the finished product. A peripheral space is provided in the mold at the edges of the molding space permitting substantially unrestricted movement of the preform into the molding space during the closing operation and providing a space for the edges of the preform during curing. The mold has mating mold members and one of the mold members has sloped lead-in surfaces at the edges of the molding surface for facilitating the movement of the preform into the molding space without distortion of the oriented fibers. The shaping may be done with at least part of the mold being heated and the curing in the mold is accomplished by locking the mold members together and applying heat to the mold.

10 Claims, 14 Drawing Figures

MOLD FOR SHAPING AND CURING REINFORCED PLASTIC MATERIAL

This invention relates generally, as indicated, to a mold construction and method for shaping and curing a preform of oriented plastic coated fibers. It is especially directed to the manufacture of rings or segments thereof where high strength is required as, for example, tire supporting rings which are mounted on a rim within a tire for supporting the tire in the deflated condition.

A supporting ring of this type is shown and described in applicant's United States patent application, Ser. No. 611,979 filed Sept. 10, 1975. Also a method and apparatus for manufacturing a ring of this type is shown and described in applicant's United States patent application, Ser. No. 611,978 filed Sept. 10, 1975 which has issued as U.S. Patent No. 3,988,089. The method and apparatus set forth in this application produce a product which is satisfactory; however, it has been found that the telescoping shear edges of the top and bottom sections of the high pressure metal mold distort the reinforcing fibers at the edges during closing of the mold. This action reduces the strength of the molded part at the edges and in some cases has reduced the life of the ring.

The prior method also included shaping and partial curing of the preform in an enclosure at a controlled temperature for a period of from four to 24 hours. Then the preform was further shaped between other forms and held in that condition in an enclosure at a controlled temperature for an additional period of approximately 48 hours. The shaped preform was then preheated in an oven to soften the material so that it would conform to the high pressure metal mold. This process requires considerable time and handling which is not desirable in a manufacturing operation.

The high pressure metal molds require high cost presses and although the molding has been satisfactory, there has been a need to mold the parts at a lower cost.

With the foregoing in mind, it is the principal object of this invention to provide for shaping and curing a preform of oriented plastic coated fibers in a mold with mold members that provide for generally unrestricted movement of the preform into a molding cavity during closing of the mold to maintain the desired orientation of the fibers.

Another object is to provide a mold with a peripheral space outward of the molding space for containing the edges of the preform during curing.

A further object is to provide a lead-in surface on at least one of the mold members at the edge of the molding space for facilitating movement of the preform into the molding space.

A still further object is to provide for relatively low pressure molding of a preform with the mold open to the space outside the mold.

Another object is to provide for holding the mold members together during curing.

A further object is to provide a vented mold in which the plastic will remain in the mold during curing.

A still further object is to provide a method of shaping and curing a preform of oriented plastic coated fibers in which the preform is supported by one of the mold members prior to shaping.

Another object is to heat the preform during shaping by application of heat from at least one of the mold members.

A further object is to provide additional plastic to one of the mold members prior to the closing of the mold.

A still further object is to provide for heating and cooling of the mold.

Another object is to provide for adding plastic and fibers to the preform at areas where the low molding pressure is not sufficient to displace the material into thicker portions of the finished product.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but some of the various ways in which the principles of the invention may be employed.

Figure 1:
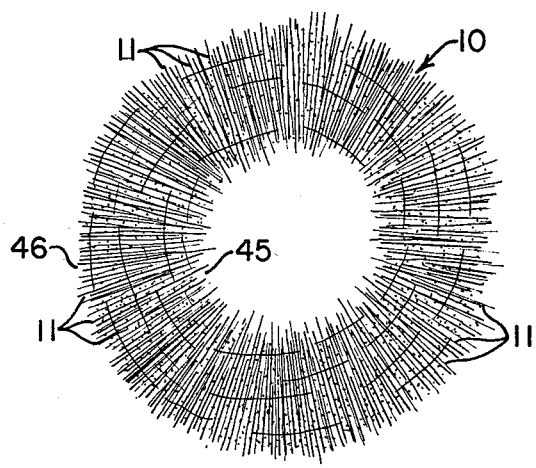
FIG. 1 is a plan view of the preform as built up by depositing fibers on a rotating table and spraying them with plastic.

Referring to FIG. 1, a preform 10 is shown which in this embodiment is an annular body of plastic coated circumferentially and radially extending fibers 11. The preform 10 may be built up by using an apparatus such as that shown and described in my copending U.S. Patent Application Ser. No. 611,978, filed Sept. 10, 1975 which has issued U.S. Pat. No. 3,988,089. In this apparatus, fiberglass roving which has been sized by impregnation with three to five percent epoxy resin is fed through cutters that cut the strands of roving in predetermined fiber lengths and project them in radial or tangential alignment onto a rotatable form covered with a liner of silicone, polyethylene or other antistick material. The rotatable form is mounted on a rotatable platform so that as the platform rotates, layers of fibers 11 are built up in predetermined orientation on the form. Simultaneously, a plastic such as epoxy resin is applied to the fibers and this may be done by one or more spray nozzles located above the rotating form.

Figure 4:
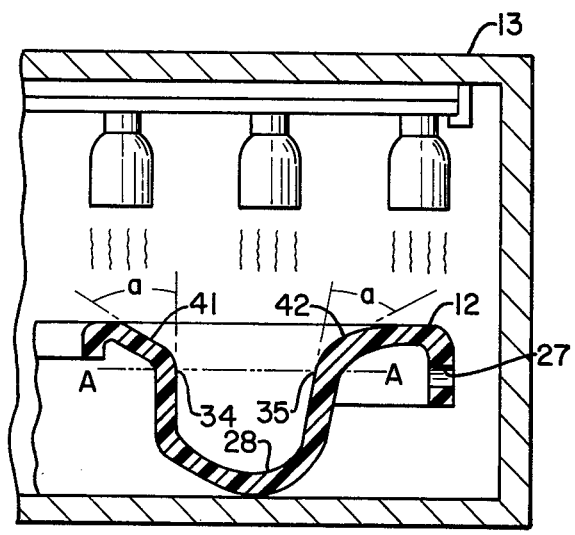
FIG. 4 is a fragmentary sectional view of the female mold member taken along the plane of line 4—4 of FIG. 2, shown in an oven for preheating prior to closing of the mold.

After the oriented fiber preform 10 has been built up, the form is removed from the platform and covered with another liner of antistick material. A second form is placed over the preform and the complete assembly is inverted to remove the first form and liner from the preform 10. At this point, a female mold member 12 may be placed over the preform and this assembly inverted so that the second form and liner may be removed to expose the other face of the preform 10. In the preferred embodiment and method, the female mold member 12 is preheated in a microwave oven 13 to a temperature of 180° to 200° F. prior to the placing of the female mold member 12 on the preform 10 as shown in FIG. 4.

Figure 12:
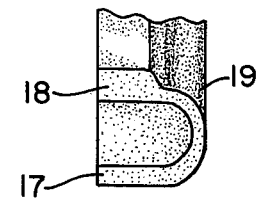
FIG. 12 is a fragmentary view taken along the plane of line 12—12 of FIG. 11.
Figure 5:
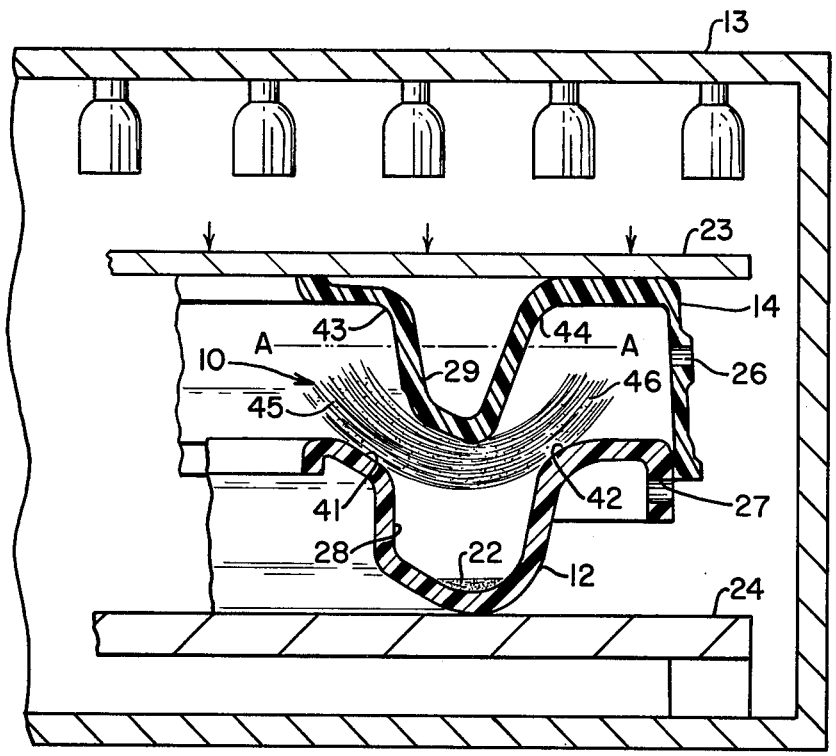
FIG. 5 is a fragmentary sectional view showing the preform positioned between the male and female mold members prior to closing of the mold and located in an oven for heating during the shaping.
Figure 11:
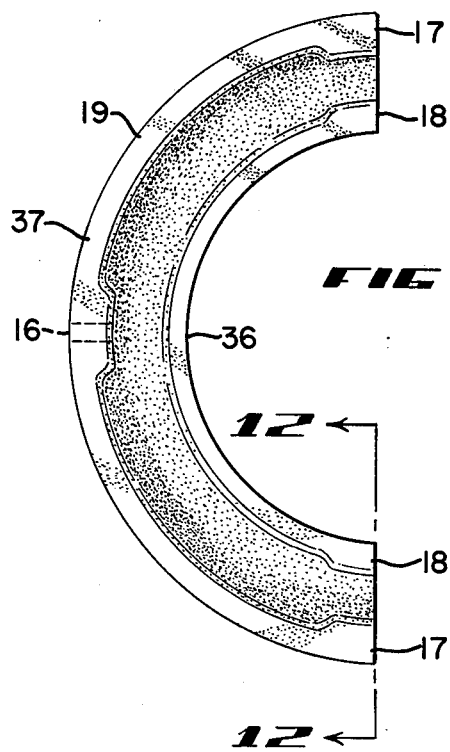
FIG. 11 is a plan view of a finished supporting member after the ring has been cut in half.

A male mold member 14 is placed over the preform 10 resting on the female mold member 12 in the general position shown in FIG. 5. Prior to placing of the male mold member 14 over the preform 10, bulk molding compound boss inserts such as pads 15 containing epoxy resin and fiberglass fibers are attached to the mold member at positions corresponding to positions 16, 17 and 18 on a molded supporting ring 19, as shown in FIGS. 11 and 12, where the thickness of the molded ring is substantially greater than the thickness of other portions of the ring.

The female mold member 12 and male mold member 14 are of a material suitable for molding plastic and in the present embodiment may be of fiberglass reinforced epoxy resin for microwave heating systems. A standard mold release material for molding plastics is applied to the female mold member 12 and male mold member 14 prior to contact of the mold members with the preform 10 to prevent sticking of the preform to the mold members.

The preform 10 is held in the position shown in FIG. 5 between the male mold member 14 and female mold member 12 for a dwell period which may be from around 5 minutes to 1 hour at a temperature of from 120° F. to 250° F. in the oven 13. During this time, part of the resin from the preform 10 will flow through the preform into the female mold member 12, then thicken, forming a pool 22 of relatively thickness viscosity flushing resin. Additional resin for pool 22 may come from extra resin sprayed on the preform 10 after it is built up in the preform building apparatus or the resin may be poured into the female mold member 12 through a hose or other means inserted between the preform and the female mold member. In the latter case, the dwell time may be eliminated and the male mold member 14 pressed down on the female mold member 12 immediately after placing it over the preform 10.

Figure 6:
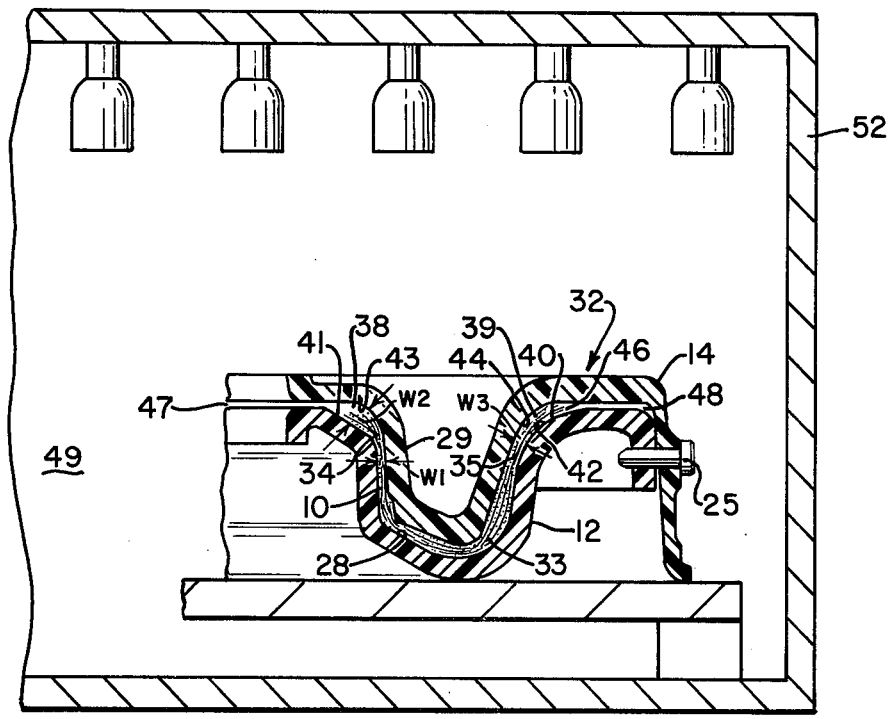
FIG. 6 is a fragmentary sectional view like FIG. 5 showing the preform shaped into a ring and the mold locked in the closed position and in an oven for curing.

The female mold member 12 and male mold member 14 are placed between press members 23 and 24, as shown in FIG. 5, and pushed together at a relatively slow rate taking ½ to 2 minutes to close with a 2-ton force producing a pressure of 20 to 50 pounds per square inch to shape the preform 10 into the configuration shown in FIG. 6. During the closing, the flushing resin in the pool 22 flows up through spaces between impregnated fibers forcing entrapped air out as the preform 10 is molded retaining desired fiber orientation.

The movement of the female mold member 12 and male member 14 together may take place in the oven 13 or outside the oven. The female mold member 12 and male mold member 14 may then be held together by locking pins 25 inserted through matching holes 26 and 27 at circumferentially spaced-apart positions around the male mold member and female mold member, respectively.

Figure 2:
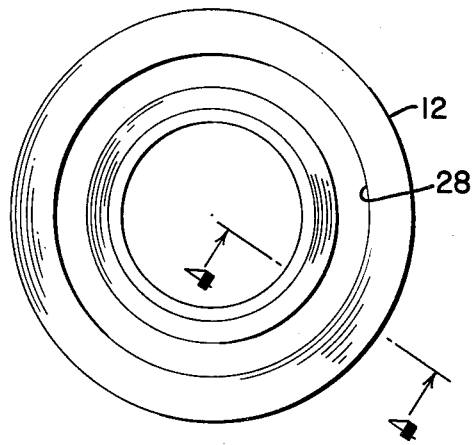
FIG. 2 is a plan view of the female mold member.
Figure 13:
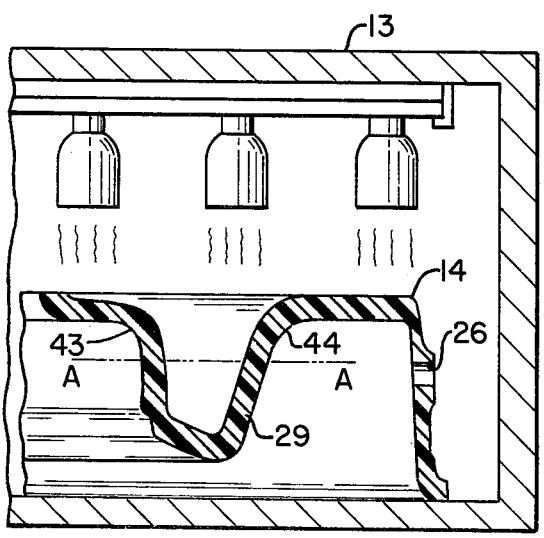
FIG. 13 is a fragmentary sectional view of a step in a modification of the method showing the male mold member being preheated in an oven.
Figure 10:
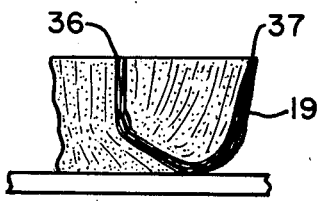
FIG. 10 is a fragmentary sectional view like FIG. 9 showing the finished ring with the edges trimmed.

As shown in FIGS. 2 and 4, the female mold member 12 is annular and has an annular mold cavity 28 extending downwardly from a transverse plane A—A as shown in FIG. 4. The male mold member 14 has a core or ring 29 extending downwardly from the transverse plane A—A as shown in FIGS. 5 and 13. Mold 32 including female mold member 12 and male mold member 14 has a molding space 33 between the ring 29 and the surface of mold cavity 28 and this molding space conforms generally with the final molded shape of the supporting ring 19 as shown in FIG. 10. Edges 34 and 35 of the molding space 33 are located at transverse plane A—A and generally conform with edges 36 and 37 of the finished supporting ring 19.

Radially inward and radially outward of the edges 34 and 35 of the molding space 33 are peripheral spaces 38 and 39 formed by lead-in surfaces 41 and 42 of the female mold member 12 and recessed surfaces 43 and 44 of the male mold member 14. As shown in FIG. 4, the lead-in surfaces 41 and 42 are at an angle (a) of from 45 to 60° to the surfaces of mold cavity 28 at the transverse plane A—A.

The peripheral space 38 is annular and radially inward of the ring 29 and is defined by the annular recessed surface 43 of the male mold member 14 and the annular lead-in surface 41 of the female mold member 12. The peripheral space 39 is annular and radially outward of the ring 29 and is defined by the annular recessed surface 44 of the male mold member 14 and lead-in surface 42 of the female mold member 12. The width ($w_1$) of the peripheral spaces 38 and 39 at the edges 34 and 35 of the molding space 33 is at least as great as the width of the molding space at these positions and the width ($w_2$) of the peripheral spaces 38 and 39 at the widest point is two to three times greater than the width of the molding space 33 at the edges 34 and 35 of the molding space.

With this construction edges 45 and 46 of the preform 10 are loosely contained in the peripheral spaces 38 and 39 after closing of the mold 32 and the orientation of the fibers 11 is substantially maintained. The orientation is also maintained during shaping of the preform 10 by the slope of the lead-in surfaces 41 and 42 of the female mold member 12 as the ring 29 urges the preform into the cavity 28. When the female mold member 12 and the male mold member 14 are pushed together and locked in position as shown in FIG. 6 by the locking pins 25, venting spaces 47 and 48 remain between the male mold member and female mold member to communicate between the peripheral spaces 38 and 39 and space 49 outside the mold 32 to vent the mold. The mold 32 may be used with the female cavity 28 extending downwardly from the transverse plane A—A to retain the liquid resin within the molding space 33 in the mold 32 and deter flow of the resin through the venting spaces 47 and 48.

Figure 7:
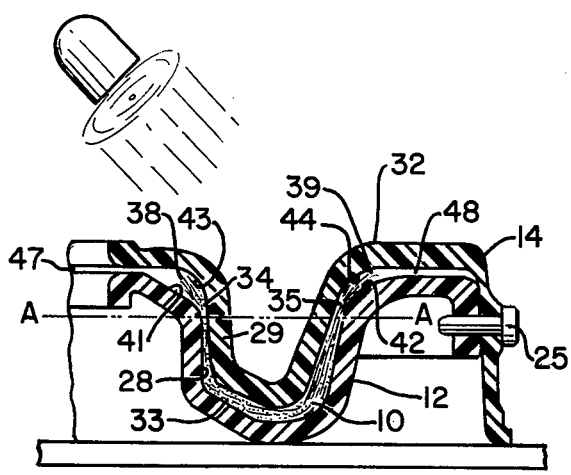
FIG. 7 is a fragmentary sectional view like FIG. 6 showing the mold outside the oven being cooled.
Figure 8:
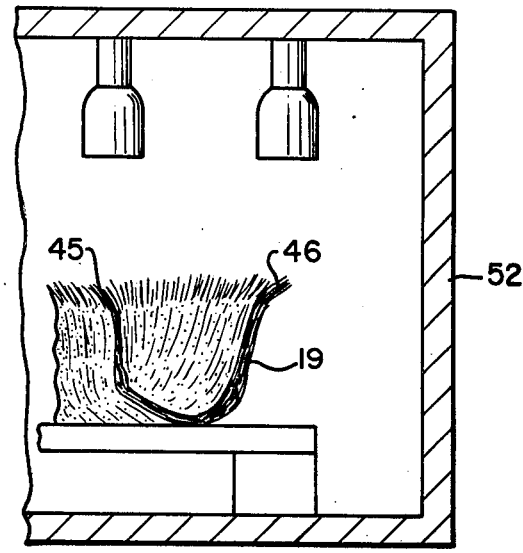
FIG. 8 is a fragmentary sectional view like FIG. 7 showing the ring after removal from the mold being postcured in an oven.

After the preform 10 has been shaped in the mold 32 and the mold locked by locking pins 25, the mold containing the preform is placed in the microwave oven 13 for heating to the curing temperature of around 325° F.

and this may take 5 minutes at 300 milliamps. The mold 32 containing preform 10 may then be placed in a standard industrial oven 52 where the preform is cured for 5 minutes at 325° F. The mold 32 and preform 10 may then be removed from the oven 52 and cooled at room temperature under an air blast for ten minutes to reduce the mold temperature to 250° to 275° F. as shown in FIG. 7. The shaped and partially cured preform 10 or ring 19 may then be removed from the mold 32 by pulling out the locking pins 25 and pulling apart the female mold member 12 and the male mold member 14. The molded ring 19 is then placed back in the oven 52 as may be required by the resin system for further post curing for approximately three hours at 325° F. as shown in FIG. 8. After the post curing, the ring 19 is removed from the oven 52 and cooled at room temperature under an air blast for ½ hour.

Figure 3:
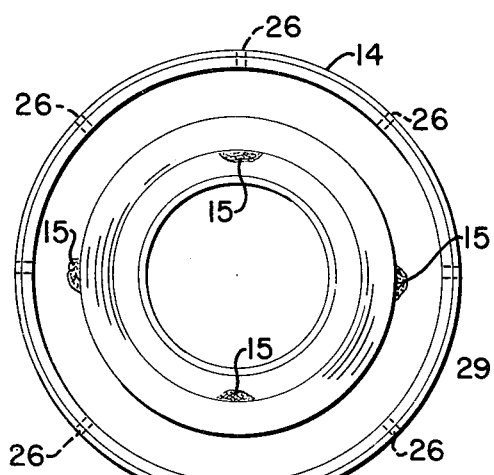
FIG. 3 is a plan view of the male mold member shown with the pads of mixing compound applied at predetermined areas.

When the ring 19 has cooled sufficiently for handling, the edges 45 and 46 may be trimmed and the supporting ring cut in halves as shown in FIG. 11. Other machining may also be performed on the supporting ring 19 as desired. Referring to FIG. 12, the cut ends of the supporting ring 19 are shown and it will be noted that these ends have thicker walls at positions 17 and 18 than the walls of the ring at other portions as shown in FIG. 10.

Where the final molded part such as supporting ring 19 has substantially the same wall thickness, the male mold member 14 need not have the pads 15 of molding compound attached to the ring 29 as shown in FIG. 3 and accordingly it may be preheated in the microwave oven 13 as shown in FIG. 13 at the same time that the female mold member 12 is preheated as shown in FIG. 4. Then when the male mold member 14 and female mold member 12 are pressed together as shown in FIG. 5, less time will be necessary for the dwell and closing the mold 32 than when the male mold member is not preheated.

Figure 9:
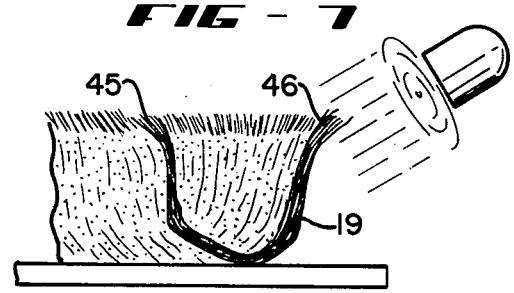
FIG. 9 is a fragmentary sectional view like FIG. 8 showing the ring after removal from the oven and being cooled.

In the method set forth hereinabove, the mold 32 was removed from the microwave oven 13 and then placed in the standard oven 52 for partial curing of the preform 10. The mold 32 and preform 10 were then removed as shown in FIG. 7, cooled and the ring 19 removed from the mold and placed back in the standard oven 52. In an alternative method, the steps of removing the mold 32 for demolding may be eliminated and the preform 10 kept in the mold during the entire curing period in the oven 52. In another alternative method, the molded preform 10 may be retained in the mold 32 and cured in the microwave oven 13 during the entire curing period. The mold 32 with the molded ring 19 may then be removed from the mircowave oven 13, cooled as shown in FIG. 7, opened and the ring cooled as shown in FIG. 9 whereupon the ring may be ready for machining and cutting in half. It can, therefore, be seen that with the mold 32 of this invention, the preform 10 may be shaped and molded in accordance with the method of this invention and at the same time flexibility is possible as to the manipulation of the preform or ring 19 prior to shaping and after shaping and curing in the mold.

Figure 14:
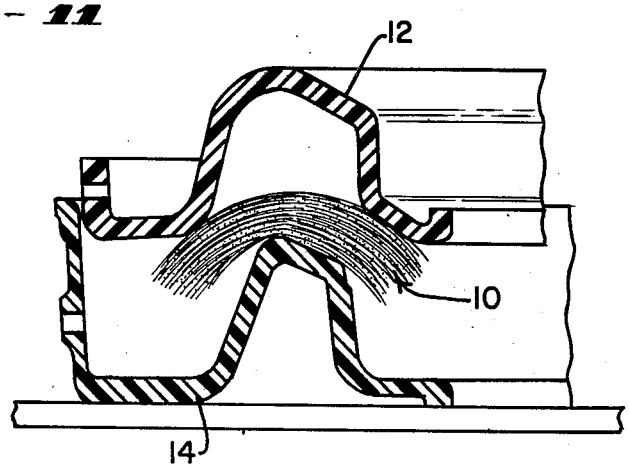
FIG. 14 is a fragmentary sectional view showing the preform supported on the male mold member and with the female mold member placed over the preform in a step of a further modification.

With the mold 32 of this invention, another alternative method includes transferring the preform 10 directly from the first form to the male mold member 14. The male mold member 14 is placed over the preform 10 and the complete assembly inverted to remove the first form and liner from the preform. The female mold member 12 is then placed over the preform 10 as shown in FIG. 14. Both the female mold member 12 and male mold member 14 may be preheated as shown in FIGS. 4 and 13 prior to positioning of the preform therebetween. The male mold member 14 and female mold member 12 are then inverted to the position shown in FIG. 5 with the preform 10 supported on the lead in surfaces 41 and 42 of the female mold member. It has been found that the extra shaping provided by the second shaping form utilized in the first described method may not be necessary with the lead in surfaces 41 and 42 which support the preform and hold it in position for shaping upon closing of the mold 32.

While certain representative embodiments and details have been shown for the purpose of illustrating the invention, it will be apparent to those skilled in the art that various changes and modifications may be made therein without departing from the spirit or scope of the invention.

What is claimed is:

1. A mold for shaping and curing a fiber reinforced body of plastic material comprising a female mold member and a male mold member for supporting a preform of oriented plastic coated fibers therebetween, a transverse plane through said female and male mold members, said female mold member having a mold cavity extending in one direction from said transverse plane, said male mold member having a core extending in said one direction from said transverse plane, said male mold member being movable toward said female mold member upon closing of said mold with said core movable into said cavity for urging said preform into a molding space defined by said core and the surface of said female mold member in said cavity, said female mold member having sloped lead-in surfaces at the edges of said cavity, said male mold member having recessed surfaces at the edges of said core, said lead-in surfaces and said recessed surfaces extending away from said transverse plane on an opposite side of said transverse plane from said mold cavity and said core, peripheral spaces enclosed by said lead-in surfaces and said recessed surfaces permitting substantially unrestricted movement of said preform from a position between said male mold member and said female mold member into said molding space during closing of said mold without distortion of said oriented plastic coated fibers and means to apply heat to said mold for curing said preform.

2. A mold in accordance with claim 1 wherein the width of each of said peripheral spaces is at least as wide as the width of said molding space at said transverse plane to provide substantially unrestricted movement of said preform into said molding cavity.

3. A mold in accordance with claim 2 wherein said width of each of said peripheral spaces is from two to three times greater than the width of said molding space at said transverse plane.

4. A mold in accordance with claim 1 wherein said molding space is vented to the space outside said mold.

5. A mold in accordance with claim 1 wherein said female and male mold members are held together by locking means in the closed position of said mold.

6. A mold in accordance with claim 5 wherein said locking means includes locking pins for insertion in matching holes in said female and male mold members at spaced-apart positions around the edges of said mold.

7. A mold in accordance with claim 1 wherein said female mold member is located below said male mold member so that the plastic material will be retained by gravity in said cavity of said female mold member.

8. A mold in accordance with claim 1 wherein said female mold member has an annular cavity, said core is a ring movable into said annular cavity upon closing of said mold defining an annular molding space, each of said lead-in surfaces includes a first frusto-conical surface radially outward of said molding space, each of said recessed surfaces includes a first annular recess spaced radially from said molding space providing annular peripheral spaces in said mold.

9. A mold in accordance with claim 8 wherein said female and male mold members are held together by locking means in the closed position of said mold and said locking means includes locking pines for insertion in matching holes in said female and male mold members at circumferentially spaced positions around said mold.

10. A mold in accordance with claim 1 wherein each of said lead-in surfaces is inclined at an angle of from 45 to 60° to the plane of said surface of said female mold member at said cavity adjacent said edges of said molding space.

* * * * *